United States Patent [19]
Koch et al.

[11] Patent Number: 6,054,821
[45] Date of Patent: Apr. 25, 2000

[54] MOTOR-VEHICLE CONVERTIBLE-TOP SYSTEM, AND A METHOD FOR OPERATING A MOTOR-VEHICLE CONVERTIBLE-TOP SYSTEM

[75] Inventors: Stefan Koch, Achern; Rolf Kremser, Neuried; Michael Soellner, Lichtenau; Arno Pruellage, Karlsruhe, all of Germany; Rob Millar, Long Hanborough; Adrian Mitcham, Oxon, both of United Kingdom

[73] Assignee: Robert Bosch GmbH, Stuttgart, Germany

[21] Appl. No.: 09/181,014

[22] Filed: Oct. 27, 1998

[30] Foreign Application Priority Data

Oct. 27, 1997 [DE] Germany .......................... 197 47 326

[51] Int. Cl.⁷ ................................. H02P 3/00; B60H 1/00
[52] U.S. Cl. .......................... 318/266; 318/283; 318/286; 236/49.3
[58] Field of Search .......................... 318/283, 434–469, 318/565, 626; 364/424.05, 424.01; 359/604, 267, 601, 603; 454/75, 129; 62/131; 165/42; 236/1 R, 91 C, 49, 3; 237/2 A, 12.36; 307/10.1

[56] References Cited

U.S. PATENT DOCUMENTS

| | | | |
|---|---|---|---|
| 4,749,193 | 6/1988 | Hacker | 296/107 |
| 4,766,356 | 8/1988 | Handa et al. | 318/55 |
| 4,810,022 | 3/1989 | Takagi et al. | 296/180.5 |
| 4,852,469 | 8/1989 | Chuang | 98/2.01 |
| 5,054,686 | 10/1991 | Chuang | 236/49.3 |
| 5,208,483 | 5/1993 | Reneau | 307/10.1 |
| 5,222,661 | 6/1993 | Wenhart | 236/49.3 |
| 5,330,385 | 7/1994 | Hotta et al. | 454/75 |
| 5,399,950 | 3/1995 | Lu et al. | 318/565 |
| 5,451,849 | 9/1995 | Porter et al. | . |
| 5,539,290 | 7/1996 | Lu et al. | 318/565 |
| 5,550,677 | 8/1996 | Schofield et al. | 359/604 |
| 5,555,502 | 9/1996 | Opel | 364/424.05 |

*Primary Examiner*—Paul Ip
*Attorney, Agent, or Firm*—Kenyon & Kenyon

[57] ABSTRACT

A convertible-top system for a motor vehicle has a signal-processing arrangement for detecting actuating commands and for controlling drive mechanisms for the convertible-top system in open and/or closed loop as a function of the actuating commands. The signal-processing arrangement emits signals, which are a function of the state of the convertible-top system, to at least one operating device of at least one external component not belonging to the convertible-top system. The external components are influenced by way of the control signals.

28 Claims, 2 Drawing Sheets

MOTOR-VEHICLE CONVERTIBLE-TOP SYSTEM, AND A METHOD FOR OPERATING A MOTOR-VEHICLE CONVERTIBLE-TOP SYSTEM

FIELD OF THE INVENTION

The present invention relates to a motor-vehicle convertible-top system and to a method for operating a motor-vehicle convertible-top system.

BACKGROUND INFORMATION

A conventional control system, as described in U.S. Pat. No. 5,451,849, for controlling a motor-vehicle convertible-top system has a plurality of components movable by electromotive drives. Belonging to the components is a convertible top having a plurality of bows that are movable between a fully extended state in which the convertible top covers the motor vehicle, and a completely retracted state, as well as a cover for a convertible-top housing in which the convertible top is accommodated in the open state.

SUMMARY OF THE INVENTION

A convertible-top system according to the present invention has the advantage that the operation of the convertible-top system, as well as of the external components, is more reliable, since the signal-processing arrangement can drive the operating devices of external components which do not belong to the convertible-top system, but which are affected by its state. For example, in the event of an adjustment, the convertible-top system can drive external components located in the movement path of the convertible-top system, in order to bring them out of the movement path. In this context, the state of the convertible-top system includes, in particular, the present position of the components of the convertible-top system relative to each other and to the motor vehicle or to the external components, the type of an adjustment command to be carried out, the physical state of the convertible-top system, etc.

In an advantageous embodiment of the present invention, the signal-processing arrangement detects the state of the external components. It is therefore possible to control the external components as well, or to avoid unnecessary interferences, e.g., because the components already have the position necessary for an adjustment of the convertible-top system.

The components especially affected by the operation of the convertible top are the rear window heating, the side windows, the air conditioning system, the trunk lock, the rear spoiler, the head restraints, the windshield washer function, and the antenna. These external components are advantageously driven by the signal-processing arrangement.

In another embodiment of the present invention, the signal-processing arrangement emits a disconnect signal to an operating device of the rear window heating when the convertible top of the convertible-top system is not closed. The rear window heating is thus out of operation when the convertible top does not cover the vehicle. Since, in the case of common convertible-top systems, the rear window is incorporated in the convertible top, damage to the convertible top or to the rear window is avoided by the disconnection.

It is also advantageous for the signal-processing arrangement to emit an opening or closing signal to an operating device of the side windows of the motor vehicle, since the side windows can be mechanically stressed and even damaged during the closing or opening of the convertible-top system. In particular, the side windows are at least partially lowered before a movement of the convertible-top system, and raised again after completion of the movement.

In another embodiment of the present invention, a disconnecting signal is emitted by the signal-processing arrangement to a motor-vehicle air-conditioning system when the convertible top of the convertible-top system is not closed. Since the air conditioning system is ineffective when the convertible top is open, this measure prevents an unnecessary waste of energy.

In another embodiment of the present invention, the control signal is emitted by the signal-processing arrangement to, for example, a electrically adjustable rear spoiler in order to retract it so that it is in a safe position during the actuation of the convertible top and damage to the rear spoiler is avoided.

In another embodiment of the present invention, the control signal of the signal-processing arrangement is emitted to the preferably electrically adjustable head restraints, so that the head restraints are lowered when the convertible top is being closed or opened and is outside of its end positions.

In another embodiment of the present invention, the control signal is emitted from the signal-processing arrangement to a washing-fluid pump of the windshield washer system, in order to prevent the application of windshield washer fluid onto the windshield when the convertible top is open and, connected with this, the possible wetting of the interior fittings of the motor vehicle and the people in it by the washing fluid.

In another embodiment of the present invention, the control signal is emitted from the signal-processing arrangement to an electrically adjustable antenna which is sunk into a protective position during the actuation of the convertible top. Thus, there is no danger of damage to the antenna or the convertible top due to a mutual obstruction.

Control of external components by the signal-processing arrangement can be carried out particularly effectively if the signal-processing arrangement is able to acquire the position of at least one component of the convertible-top system by way of position sensors. This allows the coordinated reaction to the current state of the convertible-top system.

Moreover, the signal-processing arrangement advantageously drives a visual and/or acoustical warning device of the convertible-top system which indicates to the user the operating states and fault conditions of the convertible-top system and also of the external components.

The present invention also relates to a method for operating a motor-vehicle convertible-top system in which the external components does not have to be controlled manually, but rather are brought automatically into a condition contingent upon the state of the convertible-top system. The operating comfort is increased for an operator of the motor vehicle; moreover, the convertible-top system can be operated more reliably.

DETAILED DESCRIPTION

Figure 1:
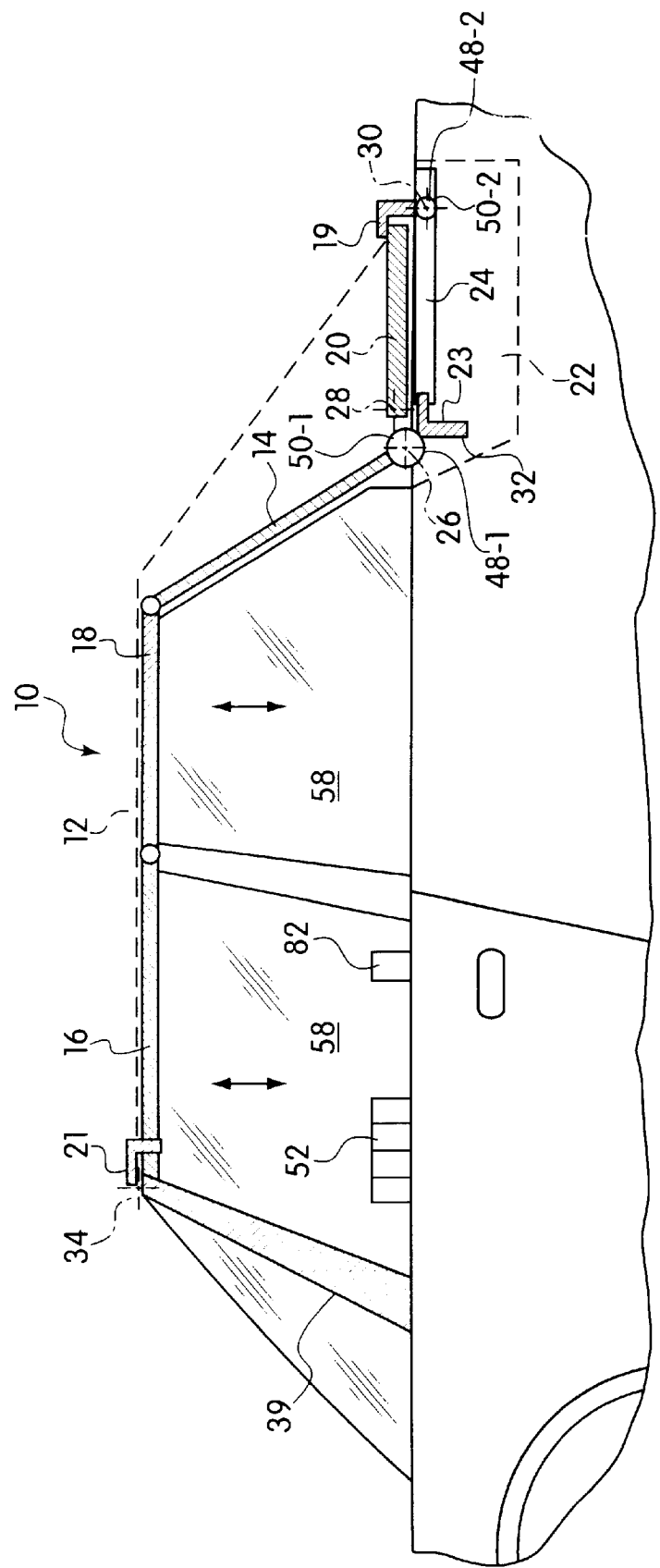
FIG. 1 shows a convertible-top system of the present invention.

FIG. 1 shows a motor-vehicle convertible-top system 10 which is operated according to the method of the present invention. Convertible-top system 10 has the following components: a convertible top 12 having a convertible-top bow 14 on which further bows 16 and 18 are mounted in a manner allowing articulation, a clamp bracket 20, a convertible-top housing 22 having a convertible-top housing cover 24, a locking unit 21 for retaining convertible top 12 on a windshield pillar 39, a lock 23 for the closure of convertible-top housing cover 24, and a rear locking unit 19. Convertible-top bracket (bow) 14 is moved on both sides by two electromotive drives 26, and clamp bracket 20 is moved on both sides by two electromotive drives 28. Another electromotive drive 30 opens and closes convertible-top housing cover 24 and is simultaneously able to restrain clamp bracket 20 with rear locking unit 19, an electromotive drive 32 latches lock 23 of convertible-top housing cover 24, and a drive 34 retains convertible top 12 in the closed state on a windshield pillar 39 by actuating locking unit 21.

Drives 26 through 32 are made in each case of electromotors having downstream gear units. Instead of electromotive drives 26 through 32, other drives, e.g. pneumatic or hydraulic drives, can also be used for driving components 12 through 24 of convertible-top system 10.

By a suitable open-loop control or a closed-loop control of drives 26 through 34, convertible top 12, covered with a fabric paulin (e.g., canvas), can be brought into its open position, in which it is sunk in convertible-top housing 22, or can be closed. In the closed state, convertible top 12 is retained by locking unit 21 on windshield pillar 39 and is clamped by clamp bracket 20. This state is shown in FIG. 1.

Figure 2:
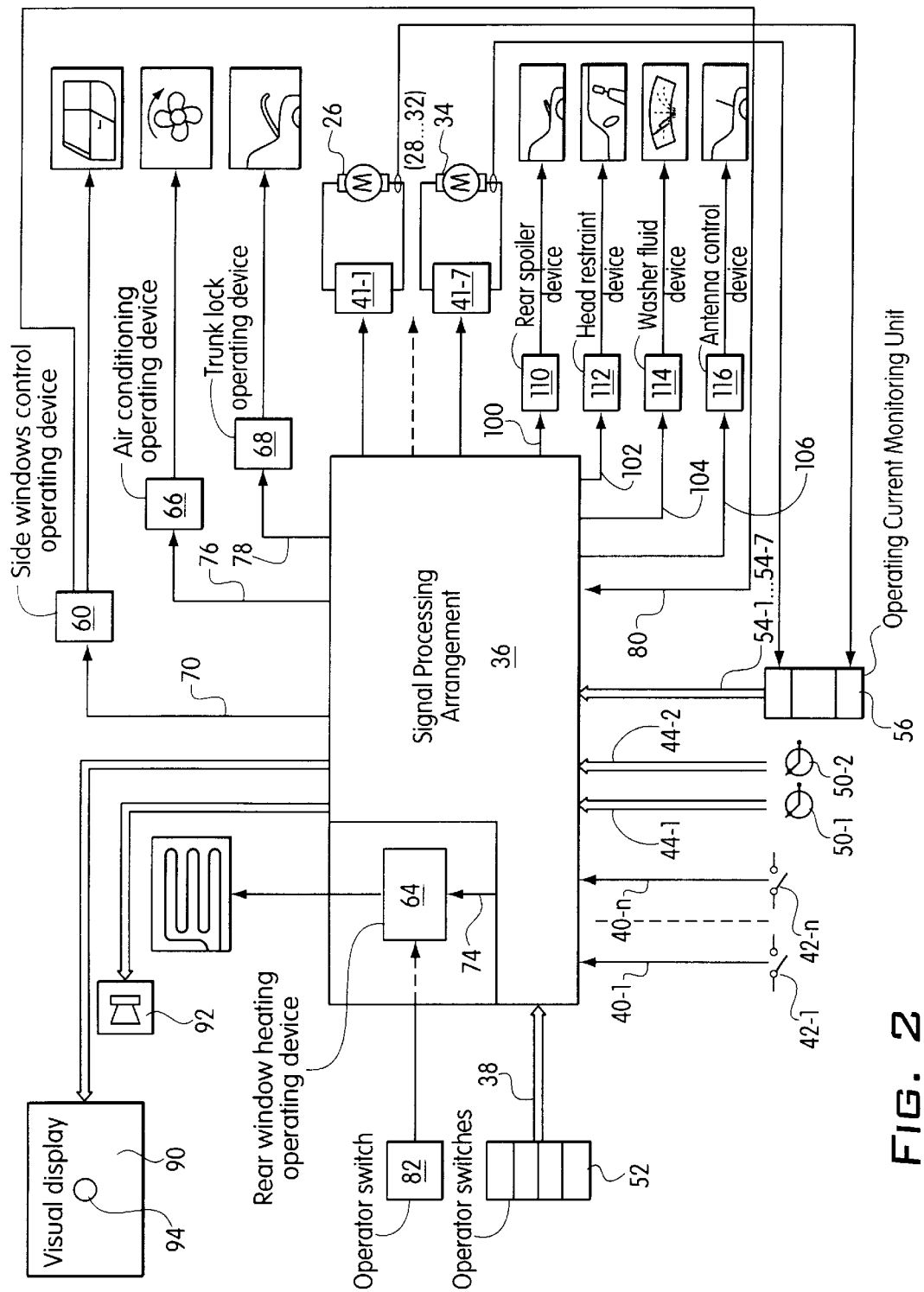
FIG. 2 shows a block diagram for an open-loop or a closed-loop control of the convertible-top system and of external components (shown in FIG. 1) using a signal-processing arrangement.

Convertible-top system 10 is controlled in open or closed loop by a signal-processing arrangement 36 shown in FIG. 2. For that purpose, an operating signal 38 is supplied to signal-processing arrangement 36 from operator switches 52, via which actuating commands for convertible-top system 10 can be given. Also supplied to signal-processing arrangement 36 are position signals from three different types of position sensors arranged on convertible-top system 10. These position signals are continuous position signals 44-1, 44-2. Position signals 44-1 and 44-2, respectively, are generated by a potentiometer 50-1 arranged at a pivot 48-1 of convertible-top bow 14, and a potentiometer 50-2 arranged on one side at a pivot 48-2 of rear locking unit 19. Potentiometers 50-1 and 50-2 are designed such that position signals 44-1 and 44-2 are proportional to the adjusting path of adjusting parts 14 and 19/24, respectively, at which the potentiometers are arranged. Secondly, position signals 54-1 ... 54-7 are supplied to signal-processing arrangement 36 from an operating-current monitoring unit 56 which evaluates the operating current consumed by each of drives 26 through 34, and emits a high or low level for the allocated drive as a function of whether the operating current exceeds or falls below a limiting value. The limiting values are set in such a way that they are undershot during normal motor operation, and are only exceeded in the event of a block of the drive; a design in the reverse sense is likewise possible.

These values are a provided as a function of the moving direction of drives 26 through 34, since drives 26 through 34 are variably heavily loaded in the case of different moving directions. Discrete position signals 40-1 ... 40-n are conducted to signal-processing arrangement 36 from microswitches 42-1 ... 42-n which sense the taking of a defined position or a small position range of individual components of convertible-top system 10.

Instead of using potentiometers 50-1, 50-2 as continuous position sensors, it is also possible to use rotational-angle sensors, e.g. Hall-effect sensor with magnet wheels, as continuous position sensors at one or more of drives 26 through 34.

Signal-processing arrangement 36 is able to operate or stop the electromotors of drives 26 through 34 using motor driver circuits 41-1 ... 41-7.

Also allocated to convertible-top system 10 are a visual display 90 and an acoustical indicator 92 which are driven by signal-processing arrangement 36. Visual display 90 signals certain states of convertible-top system 12:

- a LED (i.e., light-emitting diode) 94 of visual display 90 is active and lighted continuously when convertible top 12 is not completely closed and not completely open;
- LED 94 blinks with low frequency when necessary marginal conditions for demanded movements of convertible-top system 10 are not fulfilled; thus, for instance, the handbrake must be applied when the intention is to move convertible-top system 10;
- LED 94 blinks with high frequency when system faults are ascertained during a diagnosis of convertible-top system 10 by signal-processing arrangement 36; and
- the LED 94 is switched off when convertible-top system 10 is functioning correctly and is completely open or completely closed.

It is also possible to use different colors, different blinking frequencies, brightness modulation, blink codes (e.g. blink codes which indicate the type of fault: one long, two short light flashes=fault no. 2, corresponds to an adjustment demand, although the handbrake is applied) alternatively or simultaneously for the display of various states, or to output status messages in plain text on an alphanumerical display.

Acoustical indicator 92 likewise signals various states of convertible-top system 10:

- during the adjustment of convertible-top system 10, the indicator emits a warning tone which is a function of the convertible-top state;
- system faults are indicated by multiple tones, the length modulation and/or the frequency indicating the type of system fault;
- a sustained warning tone sounds when the vehicle speed is exceeding a limiting value, in spite of a convertible top which is not completely open or completely closed; and
- no acoustical signal sounds when the convertible-top system is completely open or closed and no fault conditions exist.

Signal-processing arrangement 36 acts upon operating devices 60, 64, 66, 68, 110, 112, 114, 116 of external components which are not parts of convertible-top system 10, but which also can be used in motor vehicles without a convertible-top system. In the exemplary embodiment, these devices are:

- an operating device 60 which raises or lowers side windows 58 of the motor vehicle by way of electromotive drives (not shown), and determines the position of individual side windows 58 by way of Hall-effect sensors in the drives as rotational sensors,
- an operating device 64 which operates a rear window heating of a rear window inset into convertible top 12,
- an operating device 66 which operates an air conditioning system of the motor vehicle,
- an operating device 68 for a trunk lock which locks or releases a trunk lid of the motor vehicle, an operating device 110 which extends and retracts or adjusts a rear spoiler on the motor vehicle, an operating device 112 for electrically adjustable head restraints on the front seats and/or rear seat in the vehicle passenger compartment, an operating device 114 for a washing-fluid pump of a windshield washer system for a windshield and/or a rear window, and an operating device 116 which retracts an electrically adjustable antenna on the outside of the motor vehicle into a retraction space in the vehicle body and moves it out of it again.

To this end, signal-processing arrangement 36 directs control signals 70, 74, 76, 78, 100, 102, 104, 106 to operating devices 60, 64, 66, 68, 110, 112, 114, 116 of the external components, i.e., side windows 58, rear window heating, air conditioning system, trunk lock, rear spoiler, head restraints, windshield washer system and antenna, as a function of the state of convertible-top system 10. From operating device 60, a position signal 80 is supplied to signal-processing arrangement 36 which allows it to determine the positions of the individual side windows 58, thus the state of side windows 58.

The external components are influenced in variable manner by control signals 70, 74, 76, 78, 100, 102, 104, 106. In the event of an adjusting operation of convertible-top system 10, e.g., upon opening and subsequent lowering of convertible top 12 in convertible-top housing 22, signal-processing arrangement 36 acquires the position of side windows 58. If individual or all side windows 58 are closed, the signal-processing arrangement emits an opening signal 70 to operating device 60, in order to lower side windows 58. Opening signal 70 is a function of the position of convertible-top system 10, and is emitted when components, for instance bows 14, 16 and 18, come near side windows 58 when folding together, and thus there is the danger of a collision, or the movement of bows 14, 16 and 18 is only permitted by lowering the side windows. If convertible top 12 has moved out of the area of side windows 58, a closing signal is emitted to operating device 60 until side windows 58 assume their original position again. In an embodiment of the present invention, a closed-loop control of side windows 58 is carried out, since signal-processing arrangement 36 acquires their position. However, an open-loop control of the lowering operation as a function of time is also possible.

Upon an arrival of a control command for opening convertible top 12, signal-processing arrangement 36 also emits a disconnect signal 74 to operating device 64 of the rear window heating, so that the rear window heating is put out of service. If convertible top 12 is open, the operation of the rear window heating is blocked by disconnect signal 74. Unlike the other operating devices 60, 66, 68, 110, 112, 114 and 116, operating device 64 of the rear window heating is integrated in signal-processing arrangement 36. The rear window heating can be switched on and off manually by way of an operator switch 82, if disconnecting signal 74 is not being applied to operating device 64. In this case, operating device 64 registers the switch actuation, but only executes a switch-on command when disconnecting signal 74 is no longer applied. Here, as in the other cases of the driving of external components as well, naturally the complementary case can also be implemented, i.e., when convertible top 12 is closed, the signal-processing arrangement emits a connect signal to operating device 64 and cancels the connect signal when convertible top 12 is open or is being opened.

Similarly, the operation of the air conditioning system is also blocked when convertible top 12 is not closed, in that signal-processing arrangement 36 emits an inhibiting signal 76 to operating device 66 of the air conditioning system.

Furthermore, the trunk lock of the motor-vehicle trunk is barred from releasing when convertible-top system 10 is in motion and is not completely open or closed. This is necessary because of the mechanical design of the convertible-top system. To that end, signal-processing arrangement 36 emits a blocking signal 78 to operating device 68 of the trunk lock.

The extended rear spoiler is furthermore retracted or adjusted when convertible-top system 10 is in motion and is not completely open or closed. For that purpose, an adjustment signal 100 is emitted by signal-processing arrangement 36 to operating device 110 of the rear spoiler.

The electrically adjustable head restraints can be driven in a similar manner. In response to putting convertible-top system 10 into operation and the movement of convertible top 12, the head restraints are lowered as far as possible and removed from the movement area of convertible top 12, in that signal-processing arrangement 36 emits a lowering signal 102 to operating device 112 for the head restraints.

In the case of the windshield washer system with a washing-fluid pump which applies the washing fluid onto a pane, preferably the windshield and/or rear window, a deactivation signal 104 is supplied from signal-processing arrangement 36 to operating device 114 of the windshield washer system during the operation of convertible-top system 10 and in the open state of convertible top 12, in order to deactivate the pump. When convertible top 12 is closed, the windshield washer system is activated, so that if necessary, the driver or an automatic wiper/washer function such as a rain sensor triggers the washing operation and the glass is cleaned.

Signal-processing arrangement 36 emits an actuating signal 106 to operating device 116 of the electrically adjustable antenna, and in particular a receiving and/or transmitting antenna. During an operation of convertible-top system 10, convertible top 12 is moved and the antenna is retracted. Otherwise, it is usually extended, particularly when the ignition lock is activated. In this manner, convertible top 12 is prevented from possibly tangling with the antenna, e.g. during strong wind, thus avoiding damage to convertible top 12 and/or the antenna.

What is claimed is:

1. A convertible-top system for a motor vehicle, comprising:

driving mechanisms; and a signal-processing arrangement detecting actuating command signals and controlling the driving mechanisms as a function of the command signals in at least one of an open loop and a closed loop, wherein the signal-processing arrangement transmits control signals to at least one operating device of at least one external component, wherein the control signals are indicative of a state of the convertible-top system, and wherein the at least one external component is not a part of the convertible-top system.

2. The convertible-top system according to claim 1, wherein the signal-processing arrangement detects a further state of the at least one external component.

3. The convertible-top system according to claim 1, wherein the at least one external component includes at least one of a rear window heating arrangement, at least one side window, an air conditioning system, a trunk lock, a rear spoiler, at least one head restraint, a windshield washer system and an antenna.

4. The convertible-top system according to claim 3, wherein the signal-processing arrangement transmits a disconnect signal to the at least one operating device of the rear window heating arrangement when a convertible top of the convertible-top system is not closed.

5. The convertible-top system according to claim 3, wherein the signal-processing arrangement transmits one of an opening signal and a closing signal to the at least one operating device of the at least one side window.

6. The convertible-top system according to claim 5, wherein one of the opening signal and closing signal is indicative of a position of the convertible-top system.

7. The convertible-top system according to claim 3, wherein the signal-processing arrangement transmits an inhibiting signal to the at least one operating device of the air conditioning system when a convertible top of the convertible-top system is not closed.

8. The convertible-top system according to claim 3, wherein the signal-processing arrangement transmits a blocking signal as one of the control signals to the at least one operating device of the trunk lock.

9. The convertible-top system according to claim 3, wherein the signal-processing arrangement transmits an adjustment signal to the at least one operating device of the rear spoiler when a convertible top of the convertible-top system is in motion, the adjustment signal being transmitted for retracting the rear spoiler.

10. The convertible-top system according to claim 3, wherein the signal-processing arrangement transmits a lowering signal to the at least one operating device of the at least one head restraint when a convertible top of the convertible-top system is in motion.

11. The convertible-top system according to claim 3, wherein the signal-processing arrangement transmits a deactivation signal to the at least one operating device of the windshield washer system when a convertible top is not closed.

12. The convertible-top system according to claim 3, wherein the signal-processing arrangement transmits an actuating signal to the at least one operating device of the antenna when a convertible top of the convertible-top system is in motion.

13. The convertible-top system according to claim 1, further comprising:
   at least one position sensor; and
   at least one internal component, wherein a position of the at least one internal component is determined by the signal-processing arrangement using the at least one position sensor.

14. The convertible-top system according to claim 13, wherein the at least one position sensor continuously detects the position of the at least one internal component.

15. The convertible-top system according to claim 14, wherein the at least one position sensor includes a potentiometer which is arranged at a pivot of the at least one internal component.

16. The convertible-top system according to claim 1, wherein the signal-processing arrangement forms the at least one operating device for the at least one external component.

17. The convertible-top system according to claim 1, wherein the signal-processing arrangement drives at least one of a visual warning device and an acoustical warning device of the convertible-top system.

18. A method for operating a convertible-top system of a motor vehicle, comprising the steps of:
   adjusting the convertible-top system, as a function of actuating commands, by a signal-processing arrangement using driving mechanisms; and
   with the signal-processing arrangement, controlling external components, wherein the external components are not elements of the convertible-top system and depend on a state of the convertible-top system.

19. The method according to claim 18, wherein the external components include a rear window heating arrangement, and further comprising the step of:
   blocking an operation of the rear window heating arrangement using the signal-processing arrangement when a convertible top of the convertible-top system is not closed.

20. The method according to claim 18, wherein the external components include side windows, and further comprising the step of:
   one of lowering and raising the side windows to permit a movement of internal components of the convertible-top system.

21. The method according to claim 18, wherein the external components include an air conditioning system, and further comprising the step of:
   blocking an operation of the air conditioning system when a convertible top of the convertible-top system is not closed.

22. The method according to claim 18, wherein the external components include a trunk lock, and further comprising the step of:
   blocking an operation of the trunk lock when the convertible-top system is moved.

23. The method according to claim 18, wherein the external components include a rear spoiler, and further comprising the step of:
   one of retracting and adjusting the rear spoiler when the convertible-top system is moved.

24. The method according to claim 18, wherein the external components include head restraints, and further comprising the step of:
   retracting the head restraints when the convertible-top system is moved.

25. The method according to claim 18, wherein the external components include a windshield washer system, and further comprising the step of:
   deactivating the windshield washer system when the convertible-top system is not closed.

26. The method according to claim 18, wherein the external components include an antenna, and further comprising the step of:
   adjusting the antenna when the convertible-top system is moved.

27. The method according to claim 18, further comprising the step of:
   emitting at least one of a visual warning signal and an acoustical warning signal when a fault condition is detected.

28. The method according to claim 18, further comprising the step of:
   controlling a movement of the convertible-top system when predetermined states of further components are analyzed.

* * * * *